United States Patent Office 3,579,452
Patented May 18, 1971

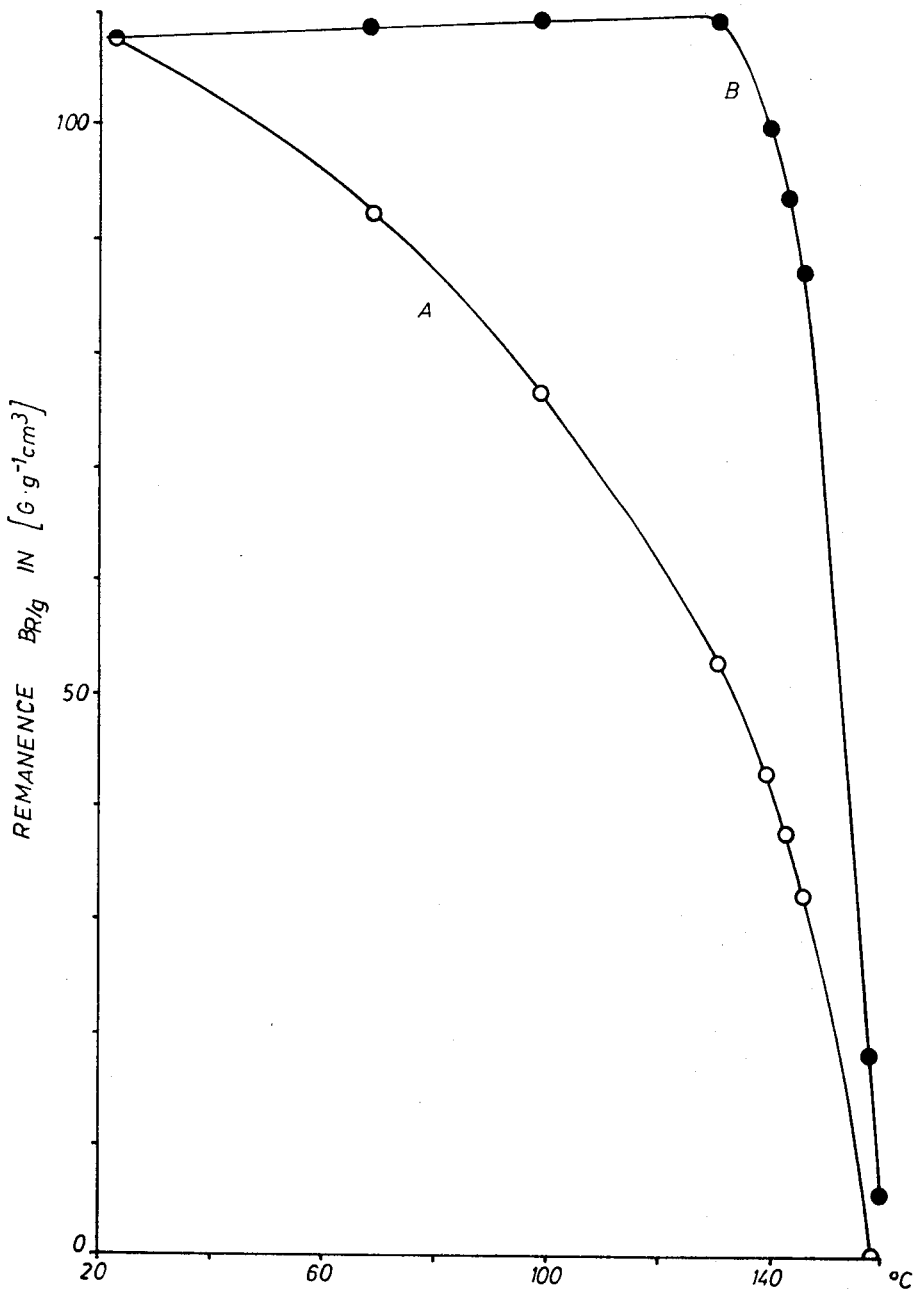

3,579,452
PROCESS FOR THE PRODUCTION OF FERROMAGNETIC PURE OR ISOTYPE MANGANATE MIXED PHASES CRYSTALLIZING IN THE ILMENITE LATTICE
Franz Hund, Krefeld-Bockum, Germany, assignor to Farbenfabriken Bayer Aktiengesellschaft, Leverkusen, Germany
Filed Aug. 28, 1968, Ser. No. 755,937
Claims priority, application Germany, Sept. 1, 1967, F 53,389
Int. Cl. C01g 45/12
U.S. Cl. 252—62.51      9 Claims

ABSTRACT OF THE DISCLOSURE

Production of ferromagnetic pure and isotype manganate mixed phases of the composition $$Ni_{1-x}Co_x \cdot 0.91-1.1 \; MnO_3;$$

where $0 \leq x \leq 0.20$ that crystallize in the ilmenite lattice, by precipitating such mixed phase constituens from an aqueous salt solution of manganese and nickel, or manganese, nickel and cobalt, ions, in quantitative proportions which correspond directly to those of the required end compound, by instantly intermixing such reactants with a basic precipitant at about 0–100° C., oxidizing the reslIting suspension, and then filtering, washing, calcining and cooling the resulting precipitate.

---

This invention relates to the production of pure or isotype manganate mixed phases of the composition: $Ni_{1-x}Co_x \cdot 0.91-1.1 \; MnO_3$; where $0 \leq x \leq 0.20$, which crystallize in the ilmenite lattice.

In recent years, ferromagnetic oxides have been used in a number of different fields, in particular for magnetic impulse recording. These new ferromagnetic oxides also include the individual compounds of $NiMnO_3$ which crystallize in the ilmenite lattice and their isotype mixed phases $Ni_{1-x}Co_xMnO_3$, where $x=$from 0.01 to 0.99, which form a continuous series of solid solutions.

These ferromagnetic materials are produced, for example, by heating a mixture of manganese dioxide and the simple oxides of nickel and/or cobalt in an aqueous medium to temperatures above 500° C. under pressures in excess of 500 atmopheres, and preferably between 1000 and 5000 atmospheres (U. S. patent specifications Nos. 2,770,523 and 2,996,457). In addition, U.S. patent specification No. 3,039,964 describes the preparation of ferromagnetic, crystalline complex oxides of manganese and at least one of the oxides of nickel or cobalt showing the structure of an ilmenite crystal. In this process, a mixture of manganese oxide with at least one of the oxides of nickel or cobalt is heated to between 500 and 800° C. at elevated oxygen pressure in the presence of at least 2% by weight of an inorganic fluxing agent which is molten at the reaction temperature. The fluxing agent may consist of boric acid, boron oxide, alkali metal hydroxides or alkali metal, silver, barium or aluminum fluorides, chlorides, sulfates, bisulfates, pyrosulfates, persulfates, perborates, tetraborates, nitrates or tungstates or mixtures thereof. The overall pressure prevailing in the system should not exceed more than about 500 atmospheres.

U.S. patent specification No. 3,039,965 relates to a process for producing the ferromagnetic crystalline complex oxides of manganese of ilmenite structure which are mentioned in U.S. patent specification No. 3,039,964, in which a mixture of manganese salts, for example potassium permanganate, manganese nitrate, oxalate, halide or carbonate and at least one nickel or cobalt salt, for example nitrates, oxalates, halides and carbonates, with an atomic ratio of Mn to the other metals in the range of from 1:1 to 2:1, is heated to a temperature in the range of from 450° C. to 800° C. under less than 500 atmospheres pressure.

French patent specification No. 1,421,055 relates to the preparation of ferromagnetic $NiMnO_3$ crystallizing in the ilmenite lattice. A mixture of manganese and nickel oxalates is precipitated with vigorous stirring at boiling point from an aqueous solution of manganese and nickel salts. After filtering, washing and drying, the precipitate is heated to a temperature of from 600° C. to 780° C. Due to the fact that the solubility of the nickel and manganese oxalate differs for each precipitation temperature, a calibration factor is required for the $Mn^{2+}:Ni^{2+}$ ratio in the aqueous solution in order to adjust the desired Mn:Ni ratio in the ferromagnetic end product for each precipitation temperature.

The processes described above have a number of disadvantages because either high pressures are necessary or alternatively the reactions have to be carried out in the presence of corrosive agents. Although the last of these processes avoids these disadvantages, it has the drawback that the process conditions need considerable control.

A technically very simple process for the production of ferromagnetic pure or isotype manganate mixed phases of the composition $Ni_{1-x}Co_xMnO_3$ where $0 \leq x \leq 0.20$, which can be carried out at atmospheric pressure in an oxygen-containing atmosphere, has now been found, in which an aqueous solution containing manganese, nickel and optionally cobalt ions, whose quantitative proportions correspond directly to those of the required end compound, is precipitated with a basic precipitant, preferably with intensive stirring, at a temperature in the range of from 0° C. to 100° C., the resulting suspension is oxidized with an oxidizing gas, e.g. air, the precipitate is filtered off, washed and, after optional predrying, is calcined at a temperature of up to 800° C. in oxygen or an oxygen-containing atmosphere and is then slowly cooled.

X-ray photographs show that the black-coloured products thus obtained have a pure ilmenite lattice whose lattice constants in A. vary regularly in dependence upon the Co content.

The manganese, nickel and/or cobalt is used in the form of any of the corresponding water-soluble salts. Although it is preferred to use the chlorides, it is also possible to employ the nitrates and/or sulfates. Suitable basic precipitants include aqueous solutions of alkali metal hydroxides such as sodium hydroxide, potassium hydroxide, ammonia solutions etc. and aqueous suspensions of the alkaline earth metals, namely, hydroxides of magnesium, calcium, strontium or barium. It is also possible to use gaseous ammonia. Precipitation should be carried out from solutions of the highest possible concentration. The bases are added in a quantity of from 70 to 130% of the stoichiometrically necessary amount. A degree of precipitation of from 80% to 115% is preferred. Optimal magnetic values are obtained in cases where precipitation is carried out as quickly as possible, i.e. in seconds or a few minutes, i.e. at most 15–20 minutes, depending upon the quantities used. Precipitation may also be carried out by combining streams of the metal salt solution and the precipitant in the precipitation vessel itself. Precipitation is preferably carried out at low temperatures, i.e. at temperatures of from 10° C. to 30° C. After precipitation the suspension is oxidized with an oxidizing gas, preferably by introducing into the suspension a finely divided stream of air, oxygen enriched air or even oxygen for a time sufficient to have all the manganese ions present in the suspension in the manganate i.e. Mn(IV)-form.

Temperatures of 820° C. should not be exceeded in the calcination of the manganate mixed phases. It is advantageous to carry out calcination in stages, optionally with intermediate grinding. For this purpose, the products are heated to about 300 to 800° C., e.g. initially heated to a temperature of from about 300° C. to 600° C. and then to a temperature above 700° C., e.g. 720–780° C., the optimum temperature being about 740° C. Calcination times of from about 30 minutes to approximately 2 hours are usually sufficient.

Calcination can be carried out in one step i.e. by heating slowly the preferably predried precipitate into a temperature of about 740° C., the whole step being finished at a time of about one half to three hours. Preferably, however, calcination is performed stepwise in two to three steps at a temperature of about 300 to 600° C. first and thereafter at about 700 to 800° C. Optionally, the first temperature range is divided in two ranges: in this case the precipitate is at first maintained for at least 10 minutes at a temperature of about 300 to 400° C., thereafter for the same time at about 500 to 600° C. and finally at about 700 to 800° C. Each step is performed under oxidizing conditions at equal or different periods of time i.e. for 10 minutes to 1 hour. After the last calcination the calcine is either cooled rapidly in 1 to 3 seconds, e.g. by chilling with water or cool air or cooled slowly in about 2 to 5 hours, i.e. without any additional precautions, whereby slow cooling is to be preferred in order to achieve products with optimum magnetic properties.

The process is extremely easy to carry out on a commercial scale. Precipitation vessels in glass, ceramics or acid-resistant steel, and enamelled or rubberised iron containers, equipped with a stirring mechanism are required in which an air and/or ammonia gas distributor is installed and which may receive the precipitation solution or suspension from a feed pipe. Filtration, washing, drying, calcination and grinding may be carried out either continuously or at intervals in simple conventional apparatus.

After they have been ground and dispersed, the resulting ferromagnetic pure or isotype manganate mixed phases $Ni_{1-x}Co_xMnO_3$ where $0 \leq x \leq 0.20$ crystallizing in the ilmenite lattice may be applied in a suitable layer thickness, for example to an organic layer support in a suitable vehicle, similar to $\gamma$-$Fe_2O_3$ or $CrO_2$, and may be used for magnetically recording sound, pictures and impulses. By virtue of the particularly low Curie temperature of about 160° C. for pure $NiMnO_3$, which is reduced even further with increasing incorporation of $CoMnO_3$ in solid solution into the $NiMnO_3$ (pure $CoMnO_3$ having a Curie temperature of about 118° C.), the ferromagnetic, pure or isotype manganate mixed phases $Ni_{1-x}Co_xMnO_3$, where $0 \leq x \leq 0.20$, crystallizing in the ilmenite lattice, may be used in other fields, as suggested above all by the characteristics remanence temperature dependence of the preparations. In the figure of the drawing, measured Br/$\delta$-values are plotted against temperature for preparation 6.2 of Example 6 and Table 6. Curve A shows values measured in a heated solenoid, whilst curve B shows values after cooling to 23° C. After the specimen had been heated to the measuring temperature, it was fully magnetized with a field of 1500 oersted and the remanence was measured after the energizing field had been cut out both at the measuring temperature indicated and after cooling to 23° C., without the energizing field being switched on again in the meanwhile. The remanence values in the heated solenoid show the high increase in temperature expected and the disappearance of the values at the Curie temperature which in this case measures about 158° C. After cooling to 23° C., the remanence shows an almost rectangular trend. Up to 135° C., the remanence increases with increasing preheating temperature and then from 140° C. falls almost vertically to zero on reaching the Curie preheating temperature.

Finely divided ferromagnetic substances such as those produced in accordance with the present invention, with low Curie temperatures and approximately rectangular Br/$\delta$-temperature curves after cooling are required, in particular for magnetic copying and duplicating processes of the kind described in U.S. patent specification No. 2,793,135. An original with areas that allow infra-red light through at different intensities, for example, in the form of drawings, letters and so on, is copied through a beam of infra-red light onto a base plate in which the aforementioned ferromagnetic material is present in fine distribution in the magnetized state. Under the areas that are permeable to light, the base plate is heated to beyond the Curie temperature, eliminating the ferromagnetism at these areas. Those areas that are not affected by the light are not heated and remain ferromagnetic. The latent magnetic image of the base plate can be made visible with a ferromagnetic toner powder, for example, after a sheet of white paper has been laid over it, and preserved in the usual way. By virtue of the inevitable lateral diffusions of heat during exposure of the base plate to infra-red light, a ferromagnetic with the aforementioned rectangular Br/$\delta$-temperature curve finely dispersed in the base plate provides a high contrast ratio among the light-dark particles of the original to be copied and hence makes even small letters easy to read. The ferromagnetic base plate for the copying and duplicating process may also contain the ferromagnetic material present in fine dispersion in the unmagnetized state. Magnetisation may be carried out during exposure. The areas affected by the infra-red light which are heated to beyond the Curie temperature are not magnetized by the energizing field. The latent magnetic image is again made visible as described above.

The relationship $0 \leq x \leq 0.20$ means that $x$ is zero or less than or at most equal to 0.20. Also, the atomic ratio of Mn:Ni or Mn:(Ni+Co) may be expressed as 1.00–1.10:1.10–1.00 or 0.91–1.1:1.

The invention is further illustrated, without limitation, by the following examples and tables, wherein the designation $$\frac{m}{2}$$

means one-half molar solution of the particular salt or cation and $$\frac{m}{1}$$

means one molar solution thereof. Slow cooling means cooling of the calcine without additional precautions, i.e. in a time of about 1 to 5 hours, depending on the quantity of the product. Quick cooling is effected by chilling the calcine with water.

EXAMPLE 1

The test conditions and results for normal (starting with 500 and 1000 ml. of a $$\frac{m}{2} Mn^{2+} \text{ and } \frac{m}{2} Ni^{2+}$$

salt solution) and inverse (starting with 500 and 1000 ml. of a $2m$NaOH-solution) precipitation, with the precipitant added in a single batch, i.e. pouring, or with the second component added dropwise over a period of from 15 to 20 minutes, are set out in Table 1. After the mixed hydroxides had been precipitated (i.e. at 20° C.) with intensive stirring, the precipitate was oxidized by bubbling air therethrough for 10 minutes, then filtered off, washed, predried at 120° C. and, after powdering in each case, was calcined by heating in three stages to the maximum temperature specified of 740° C. in the presence of air, i.e. for 30 minutes at temperature of (400+600+740° C.). Both in normal and in inverse precipitation, the best magnetic data are obtained in cases where the mixed hydroxides are precipitated in a single batch, i.e. by pouring.

EXAMPLE 2

Table 2 shows the results of tests in which the precipitation temperature was varied under otherwise the same optimal precipitation conditions mentioned in Example 1 (starting with the metal salt solution and precipitating in one batch). A precipitation temperature of around 20° C. gives optimal magnetic data.

EXAMPLE 3

Table 3 contains the magnetic data of tests in which the degree of precipitation of the $$\frac{m}{2} Mn^{2+} \text{ and } \frac{m}{2} Ni^{2+}$$

salt solution was systematically varied under the aforementioned effective working conditions, otherwise using the same type of conditions as mentioned in Example 1. At low precipitation levels (100 to 80% of the theoretical), the magnetic properties vary less noticeably than in cases where the theoretical precipitation level of 100% is exceeded in favour of significantly higher values. Calcination was performed as described in Example 1.

EXAMPLE 4

Table 4 shows the test conditions and results for theoretical precipitation of a 1000 ml.

$$\frac{m}{2} Mn^{2+} \text{ and } \frac{m}{2} Ni^{2+}$$

salt solution by 1000 ml. of 2m NaOH at room temperature in a single batch with stirring for 8 minutes, otherwise following the procedure of Example 1. The anions of the metal (II) salt solution were varied. The best magnetic data were obtained from the chloride solution, the worst from the sulfate sodium, although all anions were effective. Calcination was performed as described in Example 1.

EXAMPLE 5

In this case, the basic precipitant was varied at 100% theoretical precipitation level for metal (II) chloride solutions, otherwise following the procedure of Example 1. The test conditions and results are set out in Table 5. Judging from the magnetic values obtained, NaOH and $Ca(OH)_2$ are the best precipitant, although all were effective. Calcination was performed as described in Example 1.

EXAMPLE 6

In this example, whose conditions and results are set out in Table 6, otherwise following the procedure of Example 1, the influence of the calcination temperature upon the magnetic values was investigated for deposits precipitated and worked up under standard conditions. X-ray tests show that an ilmenite lattice is present up to 780° C., whilst, at a calcination temperature of 820° C., both the ilmenite lattice and the magnetism disappear. The choice of the calcination temperature is governed by the magnetic values required, although calcination temperatures above 800° C. irreversibly destroy the magnetic ilmenite phase.

EXAMPLE 7

Table 7 shows results for normally prepared precipitates, following the procedure of Example 1, which precipitation were quickly heated for 30 minutes at 740° C. either directly or through intermediate stages comprising calcination for 30 minutes at 400° C. and 600° C. The specimens calcined at 740° C. through intermediate stages were also cooled quickly or slowly from the final calcination temperature. The method comprising precalcination for 30 minutes at 400° C. and 600° C. and slow cooling from the final calcination temperature of 740° C. provided the best magnetic data.

EXAMPLE 8

Table 8 reports tests and their results in which ferromagnetic mixed phases of the general composition $$Ni_{1-x}Co_xMnO_3$$

of ilmenite structure ($x = 0.00-0.50$) were prepared following the procedure of Example 1. The combined manganese (II), nickel (II) and optionally cobalt (II) chloride solutions with a total volume of 500 ml. were precipitated in one batch with vigorous stirring with 500 ml. of 2m NaOH at room temperature (8 minutes), the precipitate was oxidized by bubbling air therethrough for 15 minutes, then filtered off, washed, dried at 120° C. and, after powdering, calcined for 90 minutes at equal intervals to a temperature up to 740° C., i.e. for 30 minutes at 400, 600 and 740° C. and cooled slowly from the final calcination temperature. With up to about 20 mol percent incorporation of $CoMnO_3$ into $NiMnO_3$, both the ferromagnetism and the ilmenite lattice of the isotype mixed phase remain intact. With increasing incorporation of $CoMnO_3$ in the $NiMnO_3$, the coercive force increases whilst the remanence decreases.

The ferromagnetic pure compounds crystallizing in the ilmenite lattice of $NiMnO_3$ or of the mixed phases $Ni_{1-x}Co_xMnO_3$ where $0 \leq x \leq 0.20$, obtained in accordance with the examples, may be used in a variety of fields where magnetic oxides are used, for example for magnetic pulse recording on tapes and as magnetic core materials for coils.

TABLE 1.—MAGNETIC DATA IN DEPENDENCE UPON THE TYPE AND SPEED OF PRECIPITATION

| | 500 ml. of starting solution (1,000 ml. of starting solution) | 500 ml. of precipitation solution (1,000 ml. of precipitation solution) | Type of precipitation | Calcination at 740° C. | | |
|---|---|---|---|---|---|---|
| | | | | Type of cooling | $Br/\delta$ | $_JH_o$ |
| Test number: | | | | | | |
| 1.1 | 2/m $MnCl_2$ plus 2/m $NiCl_2$ | 2 m NaOH (500 ml.) | Pouring | Slow | 93 | 368 |
| 1.2 | Same as above | do | 15 minutes | do | 49 | 68 |
| 1.3 | 2 m NaOH (1,000 ml.) | 2/m $MnCl_2$ plus 2/m $NiCl_2$ | Pouring | do | 104 | 345 |
| 1.4 | Same as above | Same as above | 20 minutes | do | 87 | 233 |
| 1.5 | 2/m $MnCl_2$ plus 2/m $NiCl_2$ | 2 m NaOH (1,000 ml.) | Pouring | do | 98 | 420 |

TABLE 2.—MAGNETIC DATA IN DEPENDENCE UPON THE PRECIPITATION TEMPERATURE

| | 1,000 ml. of starting solution (2,000 ml. of starting solution) | 1,000 ml. of precipitant (2,000 ml. of precipitant) | Precipitation temperature (° C.) | Calcination at 740° C. | | |
|---|---|---|---|---|---|---|
| | | | | Type of cooling | $Br/\delta$ | $_JH_o$ |
| Test number: | | | | | | |
| 2.1 | 2/m $MnCl_2$ plus 2/m $NiCl_2$ | 2 m NaOH (1,000 ml.) | 10 | Slow | 90 | 322 |
| 2.2 | Same as above | do | 20 | do | 98 | 420 |
| 2.3 | do | 2 m NaOH (2,000 ml.) | 20 | do | 97 | 396 |
| 2.4 | 1/m metal (II) chloride[1] | do | 20 | Quick | 99 | 453 |
| 2.5 | do | do | 80 | do | 92 | 287 |

[1] 1,011 ml. 1/m $NiCl_2$ plus 989 ml. 1/m $MnCl_2$-solution = 2,000 ml. of 1/m metal (II) chloride solution.

TABLE 3.—MAGNETIC DATA IN DEPENDENCE UPON THE DEGREE OF PRECIPITATION OF THE METAL (II) CHLORIDE SOLUTION

| | 500 ml. of starting solution | 500 ml. of precipitant | Percent precipitation of theoretical | Calcination at 740° C. | | |
|---|---|---|---|---|---|---|
| | | | | Type of cooling | Br/δ | $_jH_o$ |
| Test number: | | | | | | |
| 3.1 | 2/m MnCl₂ plus 2/m NiCl₂ | 1.60 m NaOH | 80 | Slow | 73 | 366 |
| 3.2 | Same as above | 1.80 m NaOH | 90 | ..do | 93 | 313 |
| 3.3 | ..do | 1.90 m NaOH | 95 | ..do | 91 | 460 |
| 3.4 | ..do | 2.00 m NaOH | 100 | ..do | 93 | 368 |
| 3.5 | ..do | 2.10 m NaOH | 105 | ..do | 96 | 334 |
| 3.6 | ..do | 2.20 m NaOH | 110 | ..do | 88 | 211 |
| 3.7 | ..do | 2.30 m NaOH | 115 | ..do | 87 | 141 |

TABLE 4.—MAGNETIC DATA IN DEPENDENCE UPON THE ANION OF THE METAL (II) SALT SOLUTION

| | 1,000 ml. of starting solution | 1,000 ml. of precipitant | Anion of the metal (II) salt solution | Calcination at 740° C. | | |
|---|---|---|---|---|---|---|
| | | | | Type of cooling | Br/δ | $_jH_o$ |
| Test number: | | | | | | |
| 4.1 | 2/m Mn²⁺ plus 2/m Ni²⁺-ions | 2 m NaOH | 2Cl¹⁻ | Slow | 98 | 420 |
| 4.2 | Same as above | Same | SO₄²⁻ | ..do | 37 | 103 |
| 4.3 | ..do | ..do | 2NO₃¹⁻ | ..do | 86 | 153 |

TABLE 5.—MAGNETIC DATA IN DEPENDENCE UPON THE PRECIPITANT

| | 2,000 ml. of starting solution (1,000 ml. of starting solution) | 2,000 ml. of precipitant (1,000 ml. of precipitant) | Calcination at 740° C. | | |
|---|---|---|---|---|---|
| | | | Type of cooling | Br/δ | $_jH_o$ |
| Test number: | | | | | |
| 5.1 | 2/m MnCl₂ plus 2/m NiCl₂ | 2 n NaOH (2,000 ml.) | Quick | 99 | 453 |
| 5.2 | Same as above | 2 n Ca(OH)₂ (1,000 ml.) | Slow | 73 | 403 |
| 5.3 | ..do | 1 n NaOH plus 1 n Na₂O₂ (1,000 ml.) | ..do | 96 | 280 |
| 5.4 | ..do.¹ | 2 n NH₄OH (1,000 ml.) | Quick | 71 | 288 |
| 5.5 | 0.3 m MnCl₂ plus 2/m NiCl₂ (1,000 ml.) | 0.2 m KMnO₄ plus 1.4 m NaOH (1,000 ml.) | Slow | 76 | 81 |

¹ Precipitation incomplete.

TABLE 6.—MAGNETIC DATA IN DEPENDENCE UPON THE CALCINATION TEMPERATURE

| | Type of calcination | | | | | | | |
|---|---|---|---|---|---|---|---|---|
| | 30 minutes (400+600+700° C.) | | +30 minutes 740° C. | | +30 minutes 780° C. | | +30 minutes 820° C. | |
| | Br/δ | $_jH_o$ | Br/δ | $_jH_o$ | Br/δ | $_jH_o$ | Br/δ | $_jH_o$ |
| Test number 6.1 | 93 | 539 | 99 | 453 | 56 | 408 | 0 | 0 |

| | Type of calcination | | | | | | | | | |
|---|---|---|---|---|---|---|---|---|---|---|
| | 30 minutes (400+600+700° C.) | | +30 minutes at 720° C. | | +30 minutes 740° C. | | +30 minutes 760° C. | | +30 minutes 780° C. | |
| | Br/δ | $_jH_o$ | Br/δ | $_jH_o$ | Br/δ | $_jH_o$ | Br/δ | $_jH_o$ | Br/δ | $_jH_o$ |
| Test number 6.2 | 81 | 178 | 90 | 231 | 97 | 250 | 105 | 243 | 48 | 277 |

NOTE:
6.1 = 1,011 ml. of 1 m NiCl₂- and 989 ml. of 1 m MnCl₂-solution are mixed and precipitated by pouring with 2,000 ml. of 2 m NaOH at 20° C., 8 minutes stirring.
6.2 = 400 ml. (2/m MnCl₂ plus 2/m NiCl₂) are precipitated in one pour with 400 ml. of 2 m NaOH at C. °20 and stirred for 8 minutes.

TABLE 7.—MAGNETIC DATA IN DEPENDENCE UPON THE CALCINATION CONDITIONS AT 740° C.

[Precipitant, 1,000 ml. of 2 m NaOH]

| | 1,000 ml. of starting solution | | Quick heating to 740° C. | | 30 minutes (400+600+740° C.) quick cooling | | 30 minutes (400+600+740° C.) slow cooling | |
|---|---|---|---|---|---|---|---|---|
| | ml. 1 m MnCl₂-solution | ml. 1 m NiCl₂-solution | Br/δ | $_jH_o$ | Br/δ | $_jH_o$ | Br/δ | $_jH_o$ |
| Test number: | | | | | | | | |
| 7.1 | 500.0 | 500.0 | 95 | 384 | 97 | 396 | 98 | 420 |
| 7.2 | 497.5 | 502.5 | 104 | 422 | 100 | 420 | 107 | 441 |
| 7.3 | 495.0 | 505.0 | 93 | 380 | 89 | 405 | 97 | 406 |
| 7.4 | 492.5 | 507.5 | 89 | 392 | 90 | 431 | 97 | 442 |

TABLE 8

[Magnetic data in dependence upon the composition of the Ni₁₋ₓ/CoₓMnO₃-mixed phases]

| | X in Ni₁₋ₓCoₓMnO₃ | Starting solutions: ml. 1 m solutions of— | | | Calcination at 740° C. | | |
|---|---|---|---|---|---|---|---|
| | | MnCl₂ | NiCl₂ | CoCl₂ | Type of cooling | Br/δ | $_jH_o$ |
| Test number: | | | | | | | |
| 8.1 | 0.00 | 250 | 250 | | Slow | 93 | 368 |
| 8.2 | 0.02 | 250 | 245 | 5 | ..do | 96 | 387 |
| 8.3 | 0.04 | 250 | 240 | 10 | ..do | 89 | 426 |
| 8.4 | 0.06 | 250 | 235 | 15 | ..do | 74 | 437 |
| 8.5 | 0.08 | 250 | 230 | 20 | ..do | 70 | 483 |
| 8.6 | 0.10 | 250 | 225 | 25 | ..do | 70 | 471 |
| 8.7 | 0.20 | 250 | 200 | 50 | ..do | 38 | 544 |

What is claimed is:
1. Process for the production of ferromagnetic pure and isotype manganate mixed phases of the composition

$$Ni_{1-x}Co_x \cdot 0.91\text{--}1.1\ MnO_3$$

where $0 \leqq x \leqq 0.20$ that crystallize in the ilmenite lattice which comprises precipitating said mixed phase constituents from an aqueous metal salt solution containing as reactants correspondingly manganese ions and a member selected from the group cosisting of nickel ions, and mixtures of nickel and cobalt ions, in quantitative proportions which correspond directly to those of the required end compound by reacting said reactants at a temperature of between about 0 to 100° C., with a basic precipitant selected from the group consisting of aqueous solutions of alkali metal hydroxides and ammonia, aqueous suspensions of alkaline earth metal hydroxides, and mixtures thereof, oxidizing the resulting precipitate that is suspended in said solution with an oxygen-containing gas to convert all the manganese to the tetravalent state, filtering off the precipitate in said suspension and washing the precipitate, calcining the precipitate at a calcining temperature of from about 300° C. up to 800° C., the final calcining temperature being at least about 700° C., in an oxygen-containing atmosphere and then slowly cooling the calcined material.

2. Process according to claim 1 wherein the reacting of said reactants with said basic precipitant is effected with intensive stirring.

3. Process according to claim 1 wherein the precipitation is carried out at a temperature of between about 10 to 30° C.

4. Process according to claim 3 wherein the precipitation of the metal salt solution is effected with about 70 to 130% of the corresponding stoichiometric amount of the basic precipitant.

5. Process according to claim 4 wherein a solution of the corresponding chlorides is used as the metal salt solution.

6. Process according to claim 1 wherein said calcination is carried out in a plurality of stages, at a temperature that increases from stage to stage from about 300° C. up to at most 800° C.

7. Process according to claim 6 wherein said filtered and washed precipitate is pre-dried prior to calcining.

8. Process according to claim 6 wherein said calcination is carried out in three separate stages at 300 to 400, 500 to 600 and 700 to 800° C., respectively, and upon slow cooling after the last stage the resulting calcined material is reduced to powder form.

9. Process according to claim 1 wherein said aqueous salt solution of said ions is that of a salt selected from the group consisting of chloride, nitrate, sulfate, and mixtures thereof, wherein said basic precipitant is selected from the group consisting of corresponding solutions of sodium hydroxide, potassium hydroxide, and ammonia, and suspensions of magnesium hydroxide, calcium hydroxide, strontium hydroxide, and barium hydroxide, and mixtures thereof, and wherein the precipitation is carried out at a temperature of between about 10 to 30° C., and the precipitation of the metal salt solution is effected with about 70 to 130% of the corresponding stoichiometric amount of basic precipitant.

References Cited

UNITED STATES PATENTS

| | | | |
|---|---|---|---|
| 2,770,523 | 11/1956 | Toole | 23—58 |
| 2,996,457 | 8/1961 | Swoboda | 252—62.51 |
| 3,039,964 | 6/1962 | Swoboda | 252—62.51 |
| 3,039,965 | 6/1962 | Swoboda | 252—62.51 |
| 3,380,919 | 4/1968 | Wickham | 252—62.51 |

TOBIAS E. LEVOW, Primary Examiner

J. COOPER, Assistant Examiner

U.S. Cl. X.R.

23—58